United States Patent [19]

Patton, III et al.

[11] 4,395,116

[45] Jul. 26, 1983

[54] ARTWORK GENERATION APPARATUS AND PROCESS FOR CHARTS

[76] Inventors: Charles R. Patton, III, 895 Palo Verde, Long Beach, Calif. 90815; Douglas E. Lippincott, 7861 Harhay, Midway City, Calif. 92655

[21] Appl. No.: 227,215

[22] Filed: Jan. 22, 1981

[51] Int. Cl.$^{3}$ ........................ G03B 27/32; G03B 41/00

[52] U.S. Cl. ........................................ 355/32; 355/40; 355/77

[58] Field of Search ........................ 355/32, 40, 41, 42, 355/43, 53, 54, 77, 85, 71

[56] References Cited

U.S. PATENT DOCUMENTS 3,801,201 4/1974 Greenblatt ............................ 354/40

*Primary Examiner*—L. T. Hix
*Assistant Examiner*—Alan Mathews
*Attorney, Agent, or Firm*—Wilfred G. Caldwell

[57] ABSTRACT

An apparatus and automated process to improve the accuracy and reduce the time, cost, and effort necessary to prepare reproduction artwork for charts is disclosed. A numerically or computer controlled imaging system is used to expose photographic film or emulsion with specially prepared halftone pattern symbols. This allows a computer to be used to select both the symbol and location, instead of slow and costly manual methods. Greatest benefits accrue when the final chart is to be in color. One sheet of film per primary color is exposed using a few basic symbols, which are then combined to yield a wide range of color in the symbols of the final chart. Typically, the final product of this process is one or more sheets of monochromatic film used as masters for a color printing or color key process. Further, a method is described to avoid erroneous density (and resultant color) changes where halftone symbols overlap, as well as various other methods to improve legibility and produceability of the charts.

17 Claims, 14 Drawing Figures

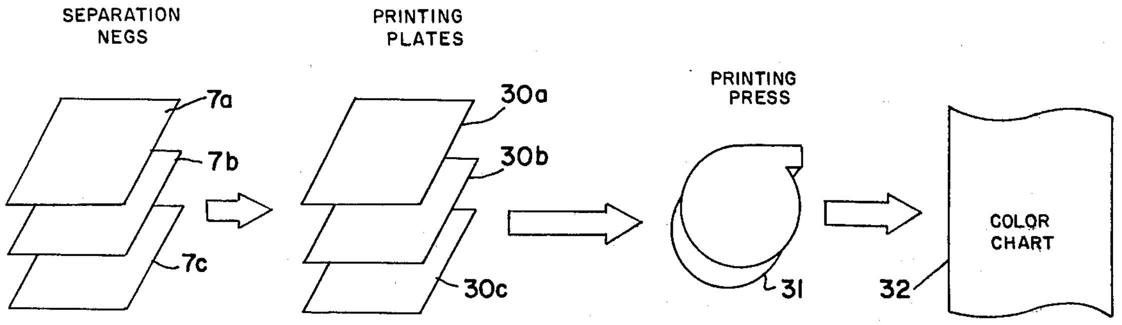
FIG. 3
FIG.4a
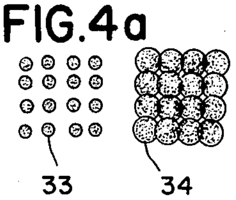
FIG.4b
FIG.4c
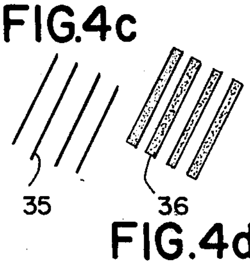
FIG.4d
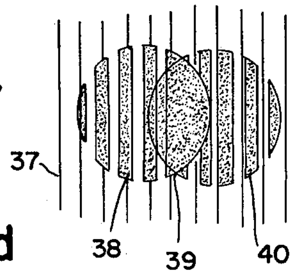
FIG.5a
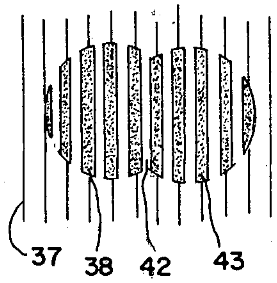
FIG.5b
FIG.6a
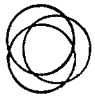
FIG.6b
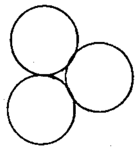
FIG.6c
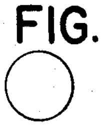
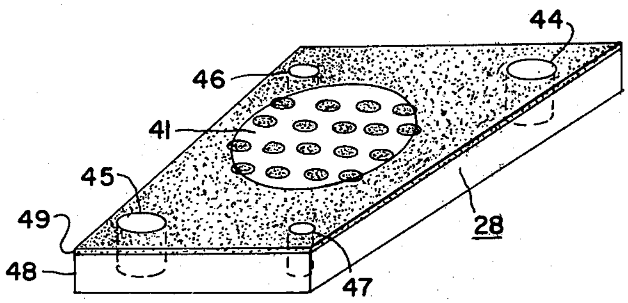
FIG.7
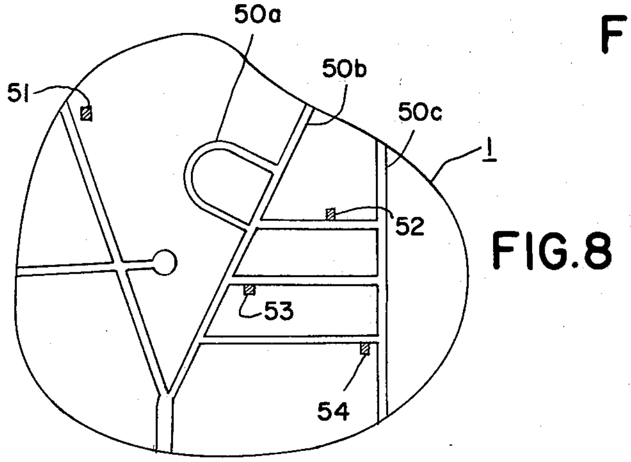
FIG.8

ARTWORK GENERATION APPARATUS AND PROCESS FOR CHARTS

FIELD OF THE INVENTION

This invention relates to artwork generation, and more particularly to the use of halftone pattern symbols for exposing a photographic medium in accordance with data represented by color and location thereof.

BACKGROUND OF THE INVENTION

The general interpretation of tables of numerical or statistical data is a problem, especially when large amounts of information are involved. An early solution was the invention of simple two dimensional graphing techniques. More sophisticated applications have since evolved which require the simultaneous viewing of data varying in three or more independent dimensions. This is particularly true for demographic data, which must overlay some type of map. Typically, three dimensional solutions use overlays of various shades of gray, or forms of crosshatching, but these methods have drawbacks. One drawback is a tendency to mask the underlying chart. Another is such methods have not been easy to integrate with computer processing.

In recent years, computing costs, as well as color reproduction costs have been coming down, which has created the need for an improved method of generating artwork for color graphs of this type, termed "charts" herein. Furthermore, since hue, intensity, and saturation may all be independently changed, a fourth and even fifth dimension is now quite possible using color.

Numerical data is now, for the most part, processed by computers, and thus it is quite logical to use them directly in the preparation of charts. Indeed, graphical output devices for computers have existed for many years for just this purpose. Equipment tends to fall into one of two catagories, medium to high resolution "hard copy" plotters, and low resolution video display systems, often with a camera attached. The highest resolution devices are photoplotters, which draw on lithographic film with light. These are used for line drawings for maps and in the electronics industry, and have been used to draw charts using solid lines. Prior to the subject invention, photoplotters had limited application in the generation of color charts having more than one color per sheet of exposed film. Very limited color output from computers has also been available using pen-plotters, which draw with liquid ink or ball-point pens. Like photoplotting, charts produced this way can only contain a few colors (one per pen), and then only solid or dashed lines. Some video display systems can be used to generate color charts under computer control, but generally suffer from a limited range of colors, and low resolution.

PRIOR ART

The closest prior art known is the computer imaging of separate sheets of monochromatic film for later combination into color, used for some time, particularly in the field of computer animation. An important new and unique characteristic of the present invention is the imaging of halftone patterns for added color latitude.

SUMMARY OF THE INVENTION

A method and apparatus for preparing artwork for charts by exposing predetermined images of halftone patterns at specified locations on one or more receiving mediums in accordance with input information.

BRIEF DESCRIPTION OF THE DRAWINGS

FIG. 3 is a diagram of the process from separation negatives to a final printed chart;

FIG. 4*a* is a magnified view of a typical halftone structure;

FIG. 4*b* is a view of a higher density halftone structure than that of FIG. 4*a*.

FIG. 4*c* is a view of a different type halftone structure;

FIG. 4*d* is a view of a higher density halftone structure than that of FIG. 4*c*;

FIG. 5*a* shows, in simplified form, a magnified view of overlaid halftone symbols before the correction process;

FIG. 5*b* shows the same view after the correction process;

FIG. 6*a* is a set of highly overlapping symbols;

FIG. 6*b* illustrates the symbols spread apart for correction;

FIG. 6*c* shows the symbols replaced by a single symbol with a representation of the count number for correction;

FIG. 7 is a view in perspective of a halftone type aperture useful in a photoplotter; and, FIG. 8 is a portion of a map with added information distributed thereon.

DETAILED DESCRIPTION OF A PREFERED EMBODIMENT

Figure 1:
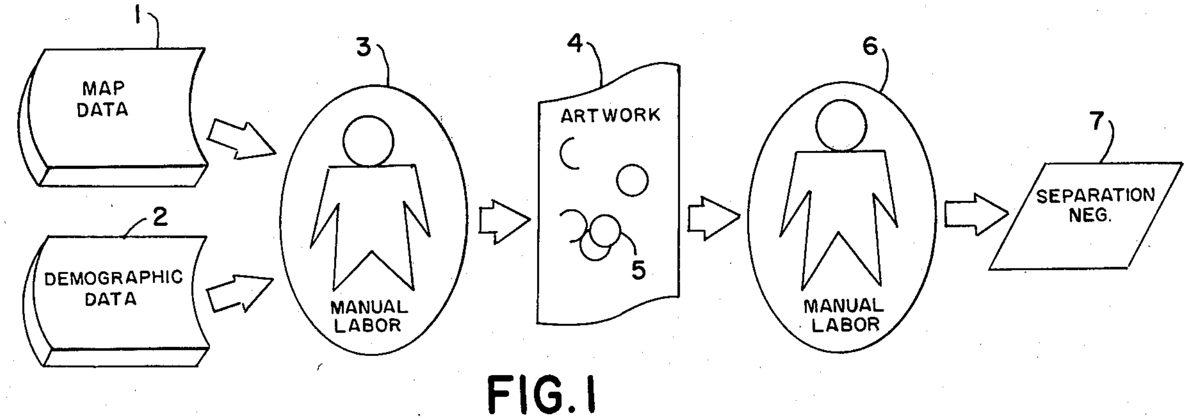
FIG. 1 is a schematic diagram of a typical prior art process.

FIGS. 1 and 8 illustrate a typical prior art problem and manual solution which may be readily resolved by the use of the present invention. In FIG. 8, a portion of map 1 is shown as depicting a region including homes, farms, stores, factories, or other insured properties.

Assume that the map is to be used by an insurance company to delineate insured homes or households, and it is desirable to show their locations and amount of insurance. First, as a sales tool, agents may pick regions of high density to exploit sales opportunities with neighboring owners. Also, the company has an aid to evaluating its risks in crime waves. Even for general information with respect to a given region, it is often desirable to management to have such information available.

Accordingly, the company may assign red, blue, green, yellow, and numerous shades of each to insured value ranges, such as $100,000 to $150,000; $150,001 to $200,000; $200,001 to $250,000, $250,001 to $300,000, and so on. Colored symbols 51, 52, 53, and 54 represent various values in the stated ranges to provide an instant impression of the location and values involved. It is an object of the present invention to quickly and inexpensively produce artwork useful for printing which includes colored symbols.

In FIG. 1, map data 1 may comprise the visual map of FIG. 8, whereas Demographic data 2 is the list of homes by address and insured value. The person or manual labor 3 translates the values to color and applies the symbols 5 to the artwork 4 for a chart. Person or manual labor 6 generates the separation negative 7 by photographic processing.

The subject invention, for automating artwork processing, exploits a mode termed "flashing" of a photoplotter 18 (FIG. 2), which is a numerically controlled imaging device most often used in the electronics and cartographic industries. "Flashing" is the ability to select and transfer a previously loaded symbolic images 28*a*, 28*b*, 28*c*, etc. to film 7' at a specified location, under external control, such as by tape 17. The symbols or symbolic images 28*a*, 28*b*, etc. to transfer are usually loaded into and stored within the machine as photographically formed images 41 (FIG. 7) on a carrier 27 (FIG. 2), termed "apertures" 28 (FIG. 7), of which several may be held, but only one (e.g. 21 FIG. 2) will be selected at any given time. Examples of photographically formed images are pictures, line drawing symbols, symbolic shapes useful in constructing printed circuit boards, etc.

For the purposes of the subject invention, the image to transfer will generally be a halftone pattern 41 (FIG. 7) in the shape of a circle or other figure. Various halftone percentages, to allow selection of appropriate densities, are in the form of different apertures, (such as 28 FIG. 7) mounted on a rotating carrier wheel 27 (FIG. 2) for selection of the appropriate aperture.

If the final product is monochromatic, the result of this imaging process will be a single sheet of film, such as *7a* (FIG. 3) with various density gray symbols to overlay an existing chart 32, or be used in the generation of new charts. If the final result is color, multiple sheets of film *7a*, *7b*, *7c* will be exposed, one for each printing color, and an optional sheet as a masking layer for the background chart, to prevent its interference with the colored symbols. The optional layer would use solid shapes of the same size and shape as the halftone pattern symbols 41 (FIG. 7).

The process of exposure at photoplotter 18 (FIG. 2) is implemented by light from source 19 under control of tape 17 via lens 20 focused on selected aperture 21 and via lens 22 focused on image spot 23 onto film 7'. Motor 26 moves carrier 27 to select desired aperture 21 under control of tape 17. Additionally, film 7' may be moved by motors 24 and 25 along orthogonal axes in order to reposition the image 23 at various locations on film 7' under control of tape 17.

Significant cost savings are possible where there are unchanging features to be included in the chart, such as a title block, or lakes, streams, or streets 50*a*, 50*b*, 50*c* (FIG. 8) in the case of maps. When the film is exposed in the imaging system, i.e. photoplotter 18 (FIG. 2), it is located using a conventional high accuracy registration system (not shown). When photoplotting is completed, each sheet is contact exposed with a negative 29 of the constant information for that color, using the same registration system, in accordance with conventional printing techniques. Again, it should be noted that "double-burning" of film for compositing, as well as high accuracy registration systems, have been in use for many years. A new and unique characteristic of the subject invention is the double exposure of the film from the photoplotter, once for the variable data and once for the constant data, rather than a subsequent copy, as was previously done. This will yield time and cost savings.

A potential problem exists where the halftone patterns partially or wholely overlap as shown at 39 (FIG. 5*a*). In the area of overlap 39, the halftone structures 38, 40 from each of the patterns most likely will not be precisely coincident. The result is a higher effective density in this area 39, and resultant undesireable density variations and subsequent color shift. This is solved by positioning the patterns in such a way that the individual halftone structures 38, 43 (FIG. 5*b*) always fall on a common periodic grid 37 projected over the entire surface of the chart. The pitch and angle of the grid would be the same as the halftone patterns, which must be constant for all percentages for a given color. An apparatus 16 (overlap adjustment and/or gridding) is used to analyze the data to be photoplotted, and make the adjustments for this "gridding" operation.

Prior art in the field of printing has shown the necessity of using different angles for the halftone patterns for each color printed to eliminate moire' patterns. For this invention different apertures are desirable in the imaging system for each color to meet this requirement. It follows that a separate grid at the appropriate angle, as discussed above, will be required for each color. The halftone structure is re-aligned to this common periodic grid.

Placing the halftone patterns precisely on the grid may be achieved in one of two ways, assuming the resolution of the imaging system is much higher than the halftone grid spacing. It is possible to use very high precision techniques in the preparation of the symbol patterns. A more economical approach is to measure the offset of each symbol from a common center point, and add the complement from adjustments table 15 (FIG. 2) (halftone compensation table) to the X–Y position when placing the symbol, such as 43 (FIG. 5*b*). While this has been accomplished by hand, using a computer tremendously expedites it.

Another potential problem exists in the presentation of some ypes of data which have symbols that overlap, as shown in FIG. 6*a*, to such an extent that proper individual symbol identification is impossible, and false colors are formed in the area of overlap. Two solutions have been invented for this problem. First, the patterns may be moved apart until legible (see FIG. 6*b*). External limitations of motion may be applied. An extension of this invention is to compare the intended colors, as would be perceived by a viewer, to determine the amount of separation necessary. As an example, a red and green pattern would require far more separation than a red and orange pattern. The second inventive innovation in this area would apply when separation is not practical due to a very high number of nearby patterns, i.e. in close proximity. In this case, many patterns of a common color would be combined into a single pattern with a representation plotted in the center for the combined count (FIG. 6*c*).

Numerical or statistical data to be charted would rarely, if ever, be organized to select the appropriate aperture for a photoplotter. This would more likely be derived from a numeric value, and a table of corresponding colors. One feature of this invention is a table driven device to accept this value-to-color table, as well as an aperture-loading- table for the photoplotter, and produce the appropriate selection commands for the photoplotter as a function of the primary color to be plotted. It is obvious that these two tables could be externally combined into the single adjustment table 15 (FIG. 2) to achieve the same purpose.

This invention has been summarized for a conventional implementation of a photoplotter. Emerging technology, laser plate makers in particular, will replace the photographically stored aperture with an electronically stored halftone equivalent. Furthermore, these same scanners may directly expose printing plates, rather than using photographic film as an intermediate image carrier. These are merely superficial changes in the implementation of a photoplotter, which for the purpose of this invention, is defined as a numerically or computer controlled device that can select and transfer a previously defined symbolic halftone image at a specified location on a photo-sensitized emulsion.

Although this invention is applicable to many types of charts, it lends itself well to demographic maps (FIG. 8), and is described as such herein. A typical example is a predominantly black and white background map 1 overlayed with colored halftone symbols 51–54 representing demographic data, such as insurance levels or claims for various homes in a region depicted by different colors for different value ranges.

Again, referring to FIG. 1, the prior method would be to take a map 1 and manually (see symbol 3) place the information as colored symbols 5, on the map to represent demographic data 2. Then the artwork 4 would be used to make halftone color separation negatives 7 by a Litographer 6. These negatives *7a, 7b, 7c* (FIG. 3) would be used to make printing plates *30a, 30b, 30c*.

The current invention (FIG. 2) takes map data 1, which is then converted by conventional means 8, such as digitizing to machine readable form on tape 9, together with demographic data 2 which is converted by conventional means 10 (e.g. keypunching) to machine readable tape 11, and then uses a computer 12 to generate commands on control tape 14 which are adjusted to a halftone grid 16, giving a modified set of tape (commands) 17 to a photoplotter 18 to flash symbols (e.g. 21) on film 7'. This film *7a, 7b, 7c* (FIG. 3) may then be 'double-burned' with constant standard information, then developed and used to make printing plates *30a, 30b, 30c* which are then used in printing press 31 to print color chart 32.

Referring to FIGS. *4a, 4b, 4c*, and *4d*, examples of regular periodic halftone structures are shown magnified. FIG. *4b* is a higher density version of FIG. *4a* because dots 34 cover more area than dots 33. FIG. *4d* is a higher density version of FIG. *4c* because lines 36 cover more area than lines 35.

With reference to FIG. *5a*, there is shown what typically can be a result of the computer process of positioning symbols 38, 40 when there is no adjustment for halftone structures. The random-like placement due to the demographic data causes overlaps 39 in the halftones 38, 40 which when printed would cause drastic shifts in color due to the change of percentage density.

Reference to FIG. *5b* shows that by correcting the placement of all symbols, such as 38 and 43, by moving them to the common grid position 37 (corresponding to the halftone grid), this will prevent the color from changing in the overlap area 42.

A typical construction of an aperture 28 (FIG. 7) is shown enlarged. It includes transparent base 48 covered by photographic emulsion 49 and has holes 44, 45 for registration in carrier 27 (FIG. 2) for photoplotter 18. Also, holes 46, 47 (FIG. 7) are provided to receive mounting screws. Exposed into the emulsion 49, is the halftone image 41.

Figure 2:
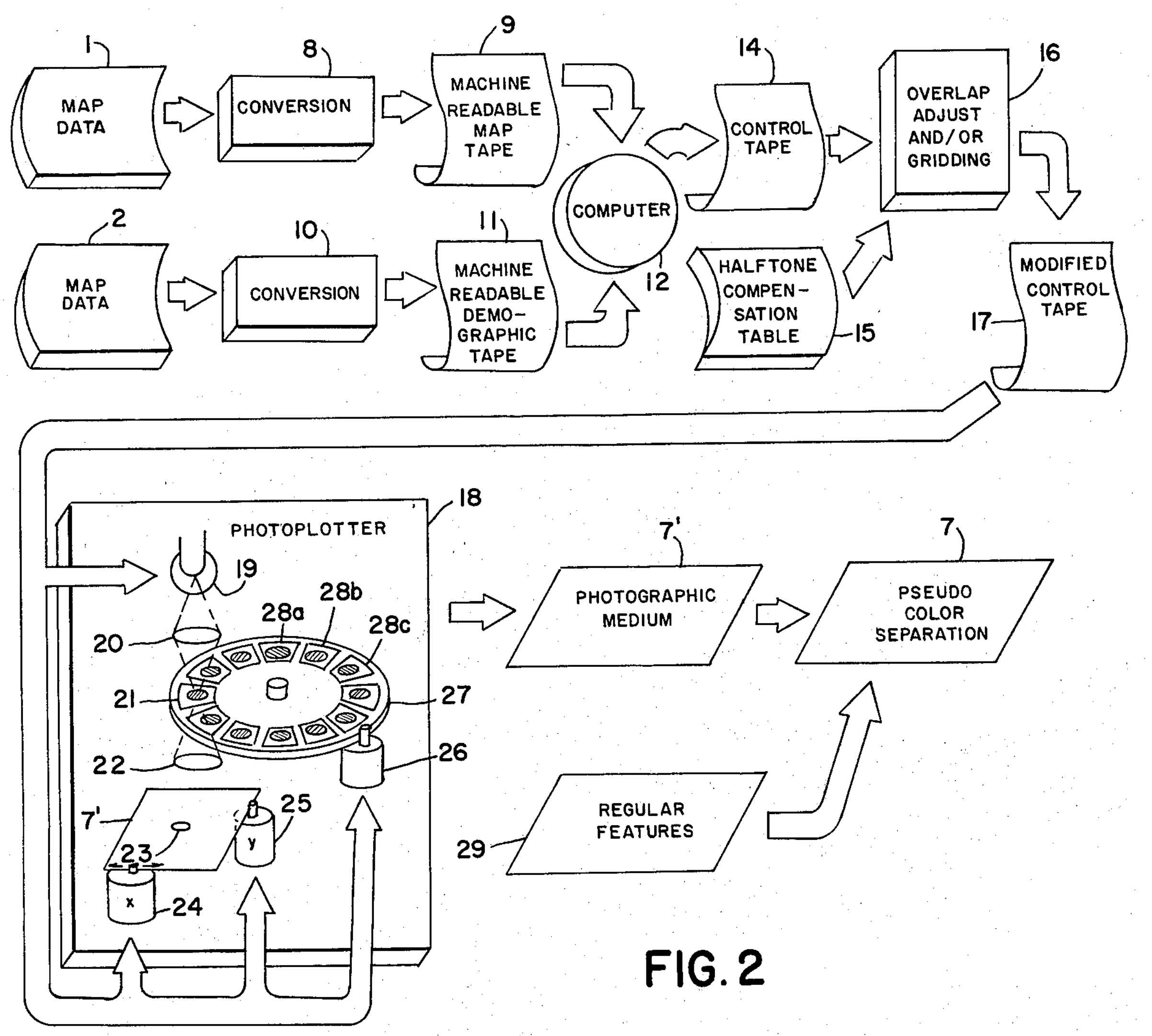
FIG. 2 is a schematic view of apparatus for carrying out the unique processes of the present invention in simplified form.

Each aperture *28a, 28b, 28c* etc. of FIG. 2 is of different percentage density, as is apparent from FIGS. *4a–4d*, and as described will ultimately determine the colors to be printed on a chart.

Color separations are a set of monochromatic photographic film sheets normally derived photographicly from full color artwork. Each sheet of film will be used to prepare an individual printing plate for use in a process color printing press yielding a final product that is a faithful color reproduction of the original artwork.

The term "pseudo-color separation" is used herein to describe a set of monochromatic photographic films which are virtually identical to normal color separation films, as described above, and which will also be used to make printing plates for a process color printing operation, but which differ significantly in their peparation. Pseudo-color separation films are synthetically imaged as individual monochromatic film sheets, and do not take on color until an actual color printing process.

What is claimed is:

1. A method for preparing artwork for charts from predetermined data depicting type of information and associated location for application to a chart, comprising the steps of:

establishing relative movement between a image receiving medium and an imaging source of an imaging station in accordance with said data to establish said locations sequentially;

providing a plurality of different symbols of halftone patterns useful for making apparent said type information at said station;

selecting from said plurality, the symbol to be imaged onto said medium in accordance with said type of information data; and flashing the selected symbol onto said medium at the associated location.

2. The method of claim 1, wherein:

said establishing locations and said selecting may encompass more than a single medium adapted for overlay to develop the complete type of information.

3. The method of claim 2, wherein:

said type of information comprises color characteristics; and, the medium means become pseudo-color separations.

4. The method of claim 1, wherein:

said halftone patterns are comprised of regular periodic structures of varying density;

the symbols of halftone patterns are aligned to a common regular periodic structure; and said alignment substantially reducing density changes in areas of symbol overlap.

5. The method of claim 3, wherein:

said halftone patterns are comprised of regular periodic structures of varying density;

the symbols of halftone patterns are aligned to a common regular periodic structure; and said alignment substantially reduces color shifts in areas of symbol overlap.

6. The method of claim 1, further comprising:

further exposing said flashed medium to a different image of unchanging features whereby artwork for a chart is produced.

7. The method of claim 1, wherein:

when said symbols to be flashed onto said medium are in mutually obscurring overlapping relationship, the step of modifying said data to separate the location data for each of said obscuring symbols.

8. The method of claim 1, wherein:

when said symbols to be flashed onto said medium are in mutually obscuring overlapping relationship, the step of replacing said obscuring symbols by a single symbol displaying a representation of the count of the replaced symbols.

9. A method for preparing artwork for color charts from predetermined data depicting demographic information represented by color and location on maps, comprising the steps of:

exposing images of halftone patterns on film at specified locations to make separation negatives directly in response to said information; and changing image locations prior to exposing to avoid color shifts due to overlapping symbols.

10. Apparatus for preparing artwork for charts from predetermined data depicting type of information and associated location for application to a chart, comprising in combination:

image station means including an imaging source;

image receiving medium means;

means responsive to said data for locating an image receiving medium relative to said imaging source to establish said locations sequentially;

means carrying a plurality of symbols of halftone patterns for presentation to said imaging source;

said patterns being uniquely useful in making apparent said type of information;

means responsive to said data for selecting the symbol to be imaged in accordance with said type of information at each of said successive locations; and, flashing each of said selected symbols onto said medium at their associated locations.

11. The apparatus of claim 10, wherein:

said image receiving medium means comprises color characteristics; and, said medium means are pseudo-color separations.

12. The apparatus of claim 10, wherein:

said plurality of different symbols comprise halftone patterns of regular periodic structure of varying density;

said periodic structures being aligned to a common regular periodic structure; and said alignment substantially reducing density changes in areas of symbol overlap.

13. The apparatus of claim 12, wherein:

said halftone patterns comprise periodic structures of varying density;

said symbols are aligned to a common regular periodic structure; and, said alignment substantially reduces color shifts in areas of symbol overlap.

14. The apparatus of claim 10, further comprising:

means for further exposing said flashed medium to a different image of unchanging features, whereby artwork for a chart is produced.

15. The apparatus of claim 10, further comprising:

means for modifying said data to separate the location data for obscuring symbols prior to flashing.

16. The apparatus of claim 10, further comprising:

means for replacing obscuring symbols by a single symbol displaying a representation of the count of replaced symbols prior to flashing.

17. Apparatus for preparing artwork for color charts in the form of separation film negatives from predetermined data depicting demographic information represented by color and location on maps using halftone patterns, comprising in combination:

means for exposing images of halftone patterns on film at specified locations to make separation negatives directly in response to said information; and, means for shifting image locations prior to exposing to avoid said color shifts due to overlapping symbols.

* * * * *